United States Patent
Ernst

(10) Patent No.: US 7,316,505 B2
(45) Date of Patent: Jan. 8, 2008

(54) METHOD OF DEFINING THE EMISSION COEFFICIENT OF A SURFACE TO BE HEATED

(75) Inventor: Holger Ernst, Bielefeld (DE)

(73) Assignee: Miele & Cie KG, Guetersloh (DE)

( * ) Notice: Subject to any disclaimer, the term of this patent is extended or adjusted under 35 U.S.C. 154(b) by 6 days.

(21) Appl. No.: 11/311,865

(22) Filed: Dec. 19, 2005

(65) Prior Publication Data
US 2006/0133446 A1 Jun. 22, 2006

(30) Foreign Application Priority Data
Dec. 18, 2004 (DE) .................... 10 2004 061 101

(51) Int. Cl.
*G01N 25/00* (2006.01)
(52) U.S. Cl. ............................... 374/9; 374/43
(58) Field of Classification Search ............ 374/9
See application file for complete search history.

(56) References Cited

U.S. PATENT DOCUMENTS

| | | | |
|---|---|---|---|
| 3,277,715 A * | 10/1966 | Vanderschmidt ............ 374/9 |
| 3,796,099 A * | 3/1974 | Shimotsuma et al. ....... 374/126 |
| 4,117,712 A * | 10/1978 | Hager, Jr. .................... 374/9 |
| 5,054,936 A * | 10/1991 | Fraden ........................ 374/164 |
| 5,481,112 A * | 1/1996 | Marui et al. ............ 250/339.14 |
| 5,727,017 A * | 3/1998 | Maurer et al. ................ 374/9 |
| 5,868,496 A | 2/1999 | Spitzberg ................... 374/128 |
| 6,375,350 B1 | 4/2002 | Stein ......................... 374/126 |
| 2005/0002435 A1* | 1/2005 | Hashimoto et al. .......... 374/43 |

FOREIGN PATENT DOCUMENTS

| | | |
|---|---|---|
| DE | 22 62 737 | 7/1973 |
| DE | 198 56 140 A1 | 6/2000 |
| EP | 0142153 | 5/1985 |
| JP | 61210921 | 9/1986 |
| JP | 10239160 | 9/1998 |
| WO | WO 95/16334 | 6/1995 |

* cited by examiner

*Primary Examiner*—Diego Gutierrez
*Assistant Examiner*—Mirellys Jagan
(74) *Attorney, Agent, or Firm*—Darby & Darby

(57) ABSTRACT

A method of defining the emission coefficient of a surface to be heated by measuring the temperature of a heating surface and the flow of heat from the heating surface to a surface to be heated to derive a pair of values representative thereof and of selecting a previously stored reference emission coefficient from a plurality thereof as a function of the pair of values.

11 Claims, 1 Drawing Sheet

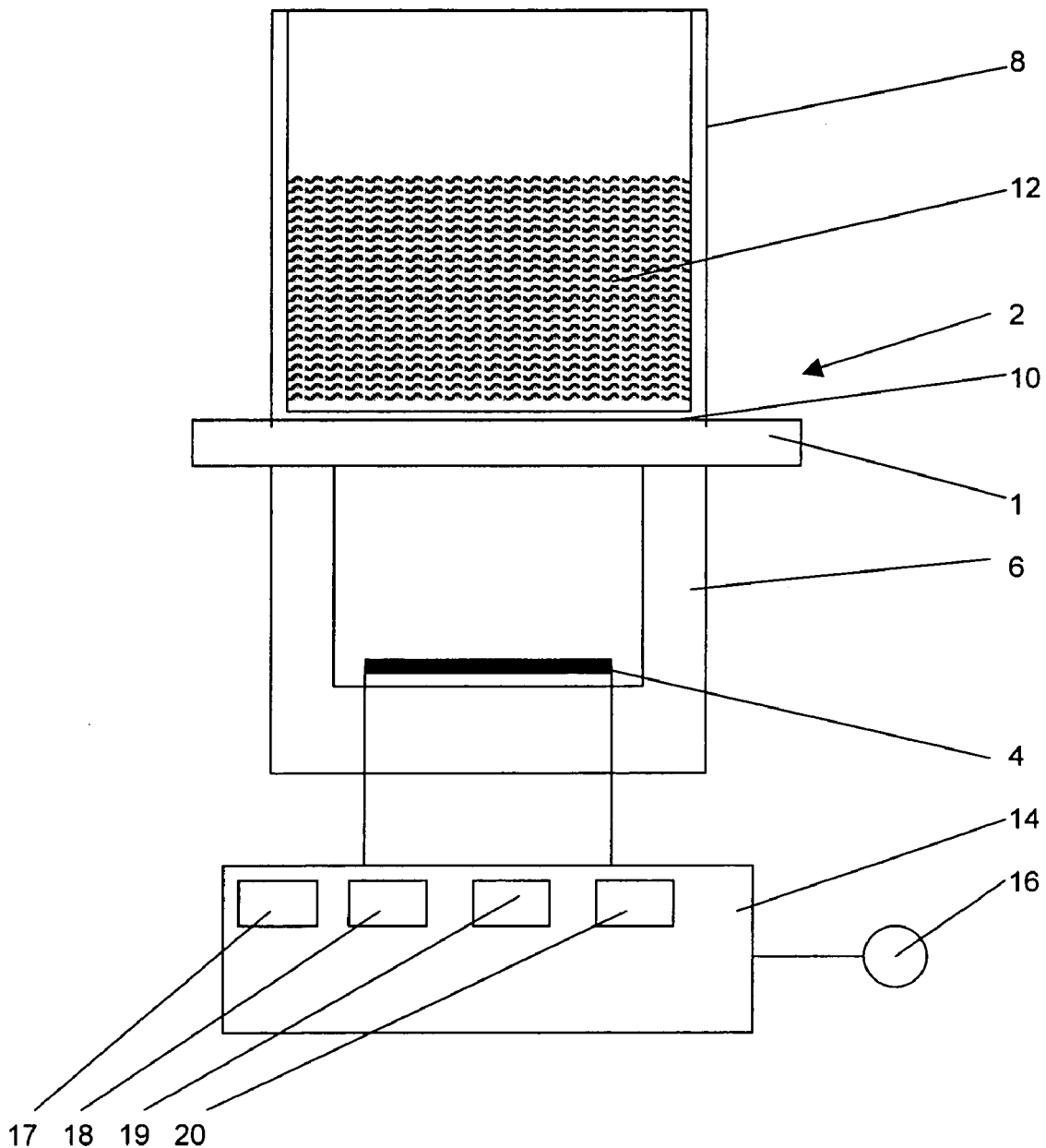
Fig

METHOD OF DEFINING THE EMISSION COEFFICIENT OF A SURFACE TO BE HEATED

BACKGROUND OF THE INVENTION

1. Field of the Invention

The invention, in general, relates to a method of defining the emission coefficient of a surface to be heated, and, more particularly, to a method of defining the coefficient of heat emission of a cooking surface or of the bottom of a cooking vessel by means of an electric evaluation unit.

2. The Prior Art

German patent specification DE 22 62 737 discloses a method of measuring the surface temperature of a metal object by means of a pyrometer in which the emission coefficient $\epsilon_2$ of a surface $A_2$ to be heated of the metal object is automatically detected for use as a corrective factor for obtaining an improved temperature measurement. For defining the emission coefficient $\epsilon_2$ of the metallic surface $A_2$, the radiated heat reflected from the metal surface $A_2$ proportioned to the radiation energy emitted from the heating surface structured as a radiating heat source.

OBJECT OF THE INVENTION

It is an object of the invention to provide an improved method of defining the emission coefficient $\epsilon_2$ of a heated surface $A_2$.

BRIEF SUMMARY OF THE INVENTION

In accordance with the invention, the object is accomplished by a method of defining the emission coefficient $\epsilon_2$ of a heated surface $A_2$ by an evaluation unit including the steps of heating the surface $A_2$ by a radiation heat source provided with a heating surface $A_1$ and an emission coefficient $\epsilon_1$, while simultaneously detecting, by an appropriate device, the flow $Q_{1/2}$ radiated from the heating surface $A_1$ in the direction of the surface $A_2$ and received by the surface $A_2$, selecting as a function of the pair of values $Q_{1/2}$-$T_1$ derived as a function of the flow $Q_{1/2}$ of heat and the heating temperature $T_1$ a reference emission coefficient $\epsilon_2$ from a plurality of reference emission coefficients $\epsilon_2$ stored in the evaluation unit.

Other objects and advantageous features of the invention will appear hereinafter.

The advantages derived from the invention, aside from offering a further method of defining the heat coefficient $\epsilon_2$ of a heated surface, are, more particularly, a simple and robust system for executing the method in accordance with the invention. This, in turn, yields a significant reduction of costs compared to systems for executing the known method.

In an advantageous embodiment of the invention resistance is measured at the radiation heat source by a device for detecting the heating temperature $T_1$. This allows detection of the heating temperature $T_1$ in a simple manner.

The type and arrangement of the device for detecting the flow $Q_{1/2}$ of heat may be selected from a wide range. For instance, the device for detecting the flow $Q_{1/2}$ of heat may be equipped with a sensor and, more particularly, a radiation detector.

In an alternative embodiment, the power level selected manually or by automatic controls for the radiation heat source is detected by the device for detecting the flow $Q_{1/2}$ of heat. In this manner the device for detecting the flow $Q_{1/2}$ can be realized in a particularly simple and, hence, cost-efficient manner.

The method in accordance with the invention and the emission coefficient $\epsilon_2$ are useful in connection with many applications. A particularly advantageous application of the method in accordance with the invention resides in the area of pyrometric temperature measurement, i.e. where the emission coefficient $\epsilon_2$ is used for detecting the temperature $T_2$ of a heated surface $A_2$ in view of the fact that this kind of temperature measurement depends upon the emission coefficient $\epsilon_2$ of the surface $A_2$ since temperature measurements used for regulating and control purposes are possible only if the emission coefficient $\epsilon_2$ is known with sufficient accuracy. This is particularly true where the pyrometric temperature measurement constitutes a component of, or is used in connection with, the control of a household appliance, such as a stove or a self-contained cooking surface.

In a particularly advantageous embodiment, the method is practiced continuously during the heating of surface $A_2$ since in this manner the accuracy of the result of detecting the emission coefficient $\epsilon_2$ is improved.

DESCRIPTION OF THE DRAWING

The novel features which are considered to be characteristic of the invention are set forth with particularity in the appended claims. The invention itself, however, in respect of its structure, construction and lay-out as well as its manufacturing techniques, together with other advantages and objects thereof, will be best understood from the following description of preferred embodiments when read in connection with the appended drawings, in which:

FIG. 1 schematically depicts a self-contained cooking field to which the method in accordance with the invention has been applied.

DETAILED DESCRIPTION OF PREFERRED EMBODIMENTS

The only drawing represents a self-contained cooking field. It is provided with a cooking surface 1 at cooking position 2 being formed, for instance, of a ceramic glass compound. Below the cooking position 2, there is provided a radiation heat source 4 constituted by an electric radiation heater. The emission coefficient of the heat source is designated $\epsilon_1$, and the radiation heat source 4 is insulated from its surroundings by a radiator insulation 6 such that only a small amount of the heat generated by the radiation heater 4 is emitted to the surroundings as lost heat. By for the greater amount of the heat generated is radiated from the heating surface $A_1$ of the radiation heater 4 in the direction of the lower surface of the cooking position 2. During a cooking operation the bottom 10 of a cooking vessel or pot 8 is placed upon the cooking position 2. The material 12 to be cooked is placed in the pot 8. The degree of transmission of the cooking surface In the area of the cooking position 2 is very high so that the flow $Q_{1/2}$ of heat radiated from the radiation heat source 4 at a heating temperature $T_1$ to the lower surface of the cooking position 2 can penetrate the cooking surface in the area of the cooking position 2 without any substantial loss. The flow $Q_{1/2}$ of heat radiated from the radiation heat source 4 is thus received by the bottom surface 10 of the pot 8, i.e. the surface $A_2$ to be heated, facing the cooking surface.

An apparatus control 14 is connected to a control knob 16 and the radiation heat source 4 such that electric power fed to the radiation heat source 4 may be set by way of the control know 16. In addition, the apparatus control 14 is provided with a device 17 for detecting the heating temperature $T_1$ and a device 18 for detecting the flow $Q_{1/2}$ of heat. During the entire cooking operation, $T_1$ and $Q_{1/2}$ are being monitored or detected continuously by way of the device 17 measuring the resistance at the radiation heat source 4 and the device 18 detecting the power level set for the cooking position 2, respectively. Furthermore, the apparatus control 14 is provided with an evaluation unit 18 and a storage or memory 20 storing a plurality of value pairs $Q_{1/2}$-$T_1$ derived from the flow $Q_{1/2}$ of heat and the heating temperature $T_1$ and associated with reference emission coefficients $\epsilon_2$.

The method functions in the manner hereinafter set forth with reference to the sole FIGURE and relevant physical equations.

The flow $Q_{1/2}$ of heat from the electric radiation heat source 4 is derived from:

$$Q = P = \frac{U^2}{R}$$

wherein Q equals $Q_{1/2}$, P equals the electric power fed to the radiation heat source 4, U equals the electric voltage at the radiation heat source 4 and R equals the electrical resistance of the radiation heat source 4. The equation substantially ignores any occurring heat loss.

The physical connection between the heating surface $A_1$ and the surface $A_2$ to be heated can be derived from the above equation and the enlarged Stefan-Boltzmann-constant, as follows:

$$Q = c_{(1,2)}A((T_1 + 273)^4 + (T_2 + 273)^4) = \frac{\sigma}{\frac{1}{\varepsilon_1} + \frac{1}{\varepsilon_2} - 1} A((T_1 + 273)^4 - (T_2 + 273)^4),$$

in which, in addition, to the equation symbols used supra $c_{1,2}$ is the radiation exchange value, $A = A_1 + A_2$, $T_2$ the temperature of the surface $A_2$ to be heated and $\sigma$ is the Stefan-Boltzmann-constant of $\sigma = 5.67 \times 10^{-8}$ $Wm^{-2}K^{-4}$. The equation ignores the fact that the surfaces $A_1$ and $A_2$ are not identical in size and that $A_1$ is not a planar surface. It is also assumed that the two surfaces are disposed parallel to each other as is the case in the embodiment described supra.

Since in the present example the heating temperature $T_1$ is much higher than the temperatures $T_2$ to be expected at the bottom surface 10 of the pot 8, and given a known heating temperature $T_1$, a known emission coefficient $\epsilon_1$ of the radiation heat source 4, a known flow $Q_{1,2}$ of heat from the surface $A_1$ to surface $A_2$ and a known construction of the self-contained cooking surface, the emission coefficient $\epsilon_2$ of the surface to be heated may be defined as follows:

The cooking position 2 is not heated. The cooking pot 8, with the material to be cooked therein, is placed with its bottom 10 onto the cooking position 2. The power level of the cooking position is set by the user by means of the control knob 16, thus feeding electric current to the radiation heat source 4 to dissipate heat. At the same time, the heating temperature $T_1$ is raised. The flow $Q_{1,2}$ of heat is detected by means of the evaluation unit 19 on the basis of the set power level and the heating temperature $T_1$ is detected by measuring the resistance at the radiation heat source 4.

The relations required for this purpose as well as the plurality relations between value pairs $Q_{1,2}$-$T_1$ and reference emission coefficients $\epsilon_2$ stored in the storage 20 were previously determined by tests with similarly constructed self-contained cooking units, and stored in the memory 20 of the apparatus control 14. In this manner, the deviations from theoretical physical relations referred to above and unavoidable heat losses were sufficiently compensated.

Once the actual heating temperature $T_1$ and the actual flow $Q_{1,2}$ of heat are available in the evaluation unit 19, the pair of values $Q_{1,2}$-$T_1$ derived therefrom is compared by in the evaluation unit 19 with stored value pairs $Q_{1,2}$-$T_1$. The emission coefficient $\epsilon_2$ associated with the most closely resembling value pair $Q_{1,2}$-$T_1$ is selected for further use in the apparatus control 14.

In the present embodiment, the method in accordance with the invention is practiced during the entire duration of heating surface $A_2$. As long as the value of the emission coefficient $\epsilon_2$ determined in this manner continues to change significantly, the system referred to above has not established itself. Only after the $\epsilon_2$ value stops changing, or its changes are within a previously established tolerable range, $\epsilon_2$ or a mean value of $\epsilon_2$ derived from the final values by conventional mathematical processes will be used for controlling the radiation heat source 4 and, therefore, the self-contained cooking surface.

In the present embodiment, the detected emission coefficient $\epsilon_2$ is used for pyrometrically measuring the temperature $T_2$ in a manner known per se. Without prior knowledge of the emission coefficient $\epsilon_2$ measuring temperature in this manner would be too imprecise for controlling the radiation heat source 4 of a cooking surface. Because of different materials and different geometries of the bottoms of cooking pots the emission coefficient $\epsilon_2$ varies widely from one pot to another. Since usually a user makes use of different cooking pots 8 which do not have bottoms 10 of uniform emission coefficients $\epsilon_2$, the use of the emission coefficient $\epsilon_2$ corresponding to any given used cooking pot 8 is required for a substantially precise control of the cooking temperature and the temperature of the cooked material 12.

They method may, however, also be practiced discontinuously, i.e. during predetermined points in time or for predetermined durations while the surface $A_2$ is being heated. In such an arrangement the system would have to have stabilized itself. This can be accomplished in ways well known to persons skilled in the art.

Practicing the method of the invention described above is not limited to the described embodiment. For instance, it could be applied to other household appliances such as other cooking implements. The method in accordance with the invention can be used in all situations in which the temperature $T_2$ of a heated surface is to be measure pyrometrically. It is also possible to defined the flow $Q_{1,2}$ of heat by means of a sensor. Setting of the power level of a cooking position 2 can, in the case, of upscale ovens or cooking appliances may take place by the apparatus control 14 as a function of cooked material selected by way of operating elements or detected by sensors of the apparatus control 14.

What is claimed is:

1. A method of defining the emission coefficient of a surface to be heated by means of an evaluation unit, comprising the steps of:

heating the surface by means of a radiation heat source provided with a heating surface and having an emission coefficient;

simultaneously determining the heating temperature using a device for determining the heating temperature of the heating surface and the flow of heat using a device for determining the flow of heat radiated from the heating surface in the direction of the surface to be heated and received by the surface to be heated; and selecting as a function of a pair of values derived from the flow of heat and the heating temperature a reference emission coefficient of the surface to be heated from a plurality of reference emission coefficients stored in a memory of the evaluation unit;

wherein the device for determining the flow of heat radiated determines the flow of heat based on a set power level of the radiation heat source.

2. The method of claim 1, wherein the step of determining the heating temperature comprises measuring the resistance of the radiation heat source.

3. The method of claim 1, wherein the flow of heat is determined by a sensor.

4. The method of claim 1, further comprising the step of monitoring the set power level set for radiation heat source using the device for determining the flow of heat.

5. The method of claim 1, wherein the power level is set manually.

6. The method of claim 1, wherein the power level is set automatically by an apparatus control.

7. The method of claim 1, wherein the method is practiced during the entire duration of heating the surface.

8. The method of claim 1, further including the step of utilizing the determined emission coefficient for pyrometrically determining the temperature of the surface to be heated.

9. The method of claim 8, wherein pyrometric determination is practiced in connection with a household appliance.

10. The method of claim 8, wherein pyrometric determination is practiced in connection with a stove.

11. The method of claim 8, wherein pyrometric determination is practiced in connection with a self-contained cooking position.

* * * * *